FIG. I

INVENTOR.
KURT W. NIEDERER

Nov. 9, 1965  K. W. NIEDERER  3,216,667
WINDING MACHINE

Filed July 25, 1963  6 Sheets-Sheet 2

INVENTOR.
KURT W. NIEDERER
BY
ATTORNEYS

Nov. 9, 1965  K. W. NIEDERER  3,216,667
WINDING MACHINE
Filed July 25, 1963  6 Sheets-Sheet 3

INVENTOR.
KURT W. NIEDERER
BY
ATTORNEYS

Nov. 9, 1965 K. W. NIEDERER 3,216,667
WINDING MACHINE
Filed July 25, 1963 6 Sheets-Sheet 4

INVENTOR.
KURT W. NIEDERER
BY
ATTORNEYS

Nov. 9, 1965 K. W. NIEDERER 3,216,667
WINDING MACHINE
Filed July 25, 1963 6 Sheets-Sheet 5

INVENTOR.
KURT W. NIEDERER
BY *Albert P. Davis*
*Burnett W. Norton*
ATTORNEYS

Nov. 9, 1965  K. W. NIEDERER  3,216,667
WINDING MACHINE

Filed July 25, 1963  6 Sheets-Sheet 6

INVENTOR.
KURT W. NIEDERER
BY
ATTORNEYS

United States Patent Office 3,216,667
Patented Nov. 9, 1965

3,216,667
WINDING MACHINE
Kurt W. Niederer, Warwick, R.I., assignor to Leesona Corporation, Warwick, R.I., a corporation of Massachusetts
Filed July 25, 1963, Ser. No. 297,594
31 Claims. (Cl. 242—27)

The present invention relates to automatic bobbin winding mechanisms and relates, more particularly, to a method and means for automatically forming a separate auxiliary winding or "end bunch" on a bobbin prepared on an automatic bobbin winding mechanism.

It is known to apply a separate end bunch of yarn on a filling bobbin intended for use in a loom equipped with an automatic filling changing mechanism. The separate end bunch customarily takes the form of a plurality of yarn coils wound on a bobbin after the main body of yarn or "service wind" has been wound on the bobbin. The end bunch is normally spaced apart from the service wind, the end bunch being situated toward the apical or tip end of the bobbin. It is to be understood that the end bunch is actually an adjunct to the service wind since, although the principal bodies of the service wind and end bunch may be physically separate, these two bodies are joined together by a continuous yarn strand which extends forwardly from the terminus of the service wind to the beginning of the end bunch. Such end bunch, then, forms a ready means for automatically locating the leading end of the wound bobbin preliminary to the introduction of the bobbin into the loom shuttle. The end bunch can be seized readily and stripped off the bobbin by mechanical, pneumatic or other means and held in readiness for withdrawal of the yarn from the service wind. This obviates the need for searching over the surface of the bobbin in order to locate the outer end of the service wind for unwinding.

In the following specification and claims the term "yarn" is employed in a general sense to relate to all kinds of strand material, either textile or otherwise.

The invention has as one of its objects to provide a method and mechanism for automatically forming an end bunch of yarn on a bobbin at a position spaced apart from the service wind and toward the apical end of the bobbin.

Another object of the present invention is to provide a method for forming an end bunch of yarn on a bobbin, securing the end bunch in position for ready removal, and severing the supply yarn therefrom once the end bunch has been formed and secured.

A further object of the present invention is to provide a mechanism for controlling the size of the end bunch on a bobbin.

Yet, an additional object of the present invention is to provide an apparatus for forming an end bunch of yarn on a bobbin, securing the terminus of said end bunch against inadvertent unwinding or removal, and thereafter severing the supply yarn from the end bunch.

Still another object of the present invention is to provide an apparatus for forming an end bunch on a bobbin which apparatus may be readily incorporated in existing automatic bobbin winding mechanisms.

An additional object of the present invention is to provide an apparatus having means for conveniently severing the supply yarn from the outer end of a coil of yarn wound on said bobbin wherein these yarn ends are severed and the end extending from the yarn coils on the bobbin is securely held momentarily in order that the outer end of the yarn may be drawn tightly on the coils to secure said coils on the bobbin.

A further object of the present invention is to provide a method and apparatus for forming an end bunch of yarn on a bobbin in a simple and reliable manner.

Other objects of the present invention will in part be obvious and will in part appear hereinafter.

The invention accordingly involves provision of means associated with an automatic bobbin winding mechanism wherein a service wind is first formed on a rotating bobbin and, sequentially thereafter, the outer end of yarn is moved rapidly and laterally toward the tip of the bobbin, whereupon the end bunch is formed, and finally the terminal end of the yarn is secured to the end bunch and the supply yarn is severed therefrom.

Figure 1:
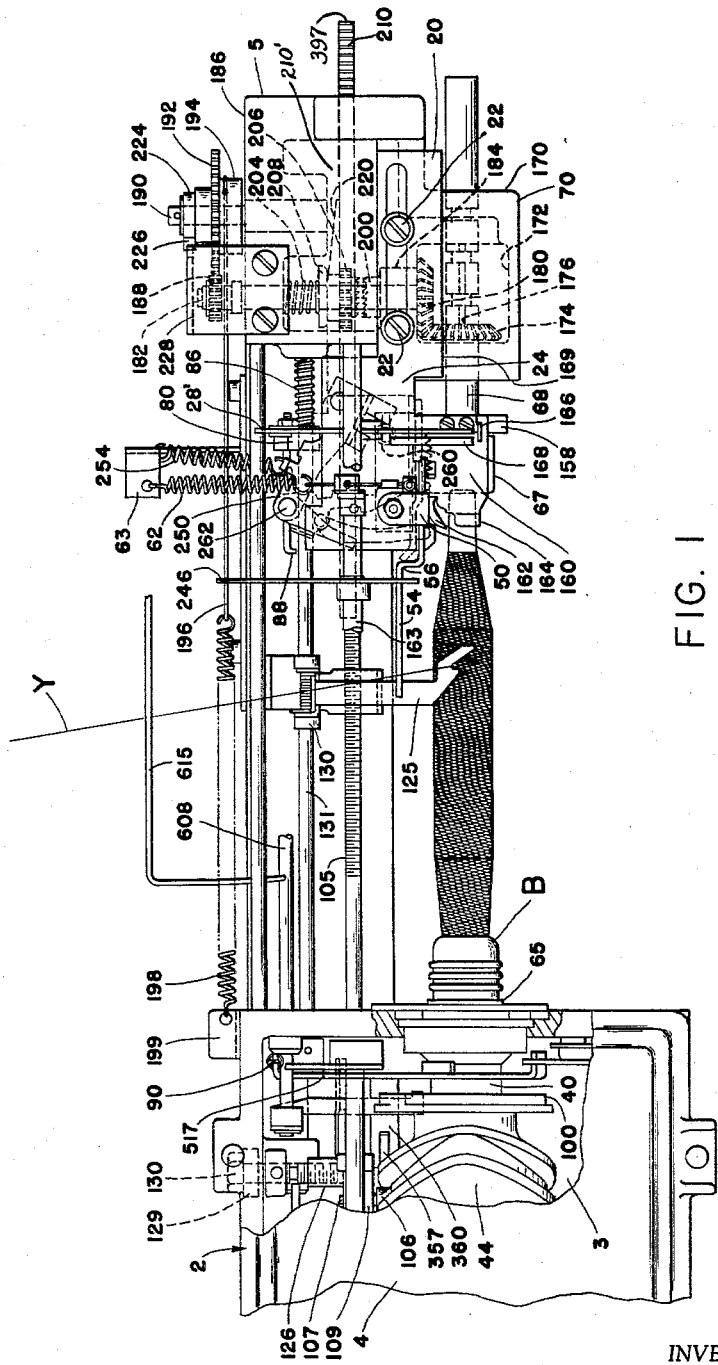
FIG. 1 is a top plan view of an automatic bobbin winding mechanism incorporating the present invention.

*Description of the related components of the prior art mechanism*

Before commencing the detailed description of the invention in connection with the accompanying drawing, it should be brought out that while the invention is capable of adaptation to other textile apparatuses it has been especially designed for use in connection with the automatic bobbin winding mechanism of U.S. Patent 2,763,-443 and is illustrated in connection with that mechanism. However, only so much of the unmodified structure of that machine has been set forth in the drawing as is necessary to an understanding of the relationship between that unmodified structure and the structure of the instant invention. In order to facilitate a correlation between the invention and the parts of the machine of the patent, the unmodified components thereof will be referenced by the same numeric designations as were employed in the patent.

Insofar as the related parts of the prior art mechanism are concerned, with particular reference to FIGS. 1–5 of the drawing a box-like casing 2 of rectangular shape comprising a bottom section 3 and surmounted by a cover section 4 is provided. Substantially all of the driving means and the cycling mechanism for controlling the automatic operation of the winding means, doffing means, donning means, and means for operating the end winding mechanism are contained wtihin composite casing 2. Moreover, the cover section 4 may be employed for mounting an electric motor, not herein illustrated, for driving the various mechanisms of the automatic bobbin winding machine in a manner fully described in the cited patent. As will be seen hereinafter the drive for the end bunch winding mechanism is transmitted through selected members of the automatic bobbin winding mechanism which, in turn, are operated by the aforesaid electrical motor.

Figure 5:
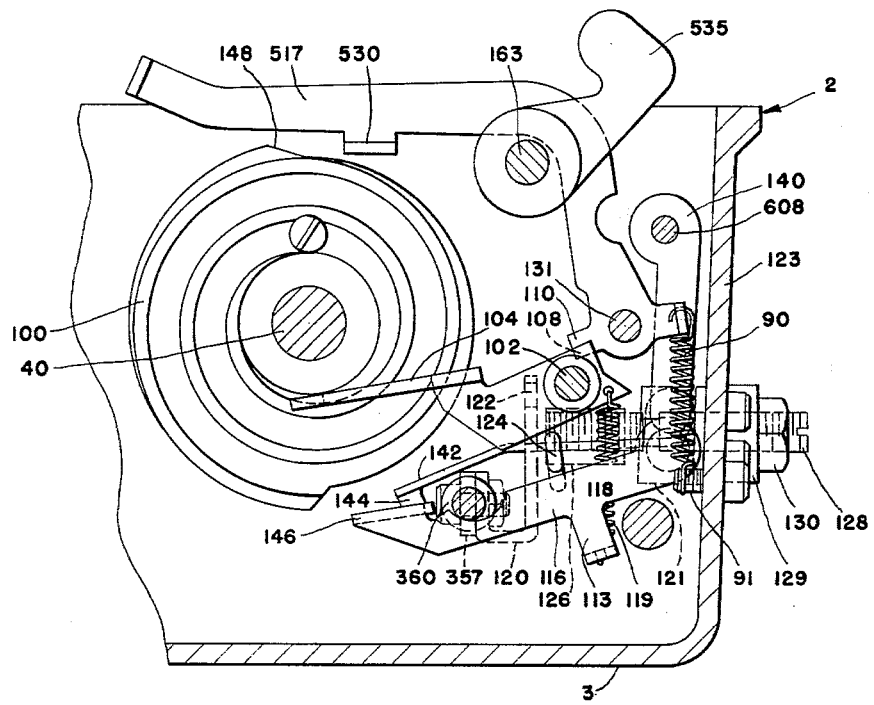
FIG. 5 is a view taken along lines V—V of FIG. 4.

A shaft 40, FIG. 5, constituted as the winding spindle of the machine is disposed within casing 2 and is rotated through means connecting it to the power source previousy alluded to in the manner shown in the prior cited patent. The winding spindle 40 serves as the means for rotating the winding bobbin B and also for driving a helical cam 44. In turn, cam 44 serves to reciprocate the traverse means of the winding mechanism whereby yarn is distributed on bobbin B.

The bobbin B is donned in winding position with its butt end fastened in a concave disc or driver chuck 65 which is securely attached to the forward end of spindle 40. The apical or outer end of bobbin B is seated in a rotary chuck 67 independently journalled on and connected to one end of a rotary spindle 68. Chuck 67 may therefore rotate while spindle 68 remains stationary and, similarly, spindle 68 can be rotated while chuck 67 is held stationary. Spindle 68 is slidably mounted in a suitable bearing of a tail stock bracket 70 mounted on an outboard bracket 5. The outboard bracket 5 in turn extends horizontally from the forward end of casing 2. The means for rotating spindle 68 is described hereinafter in connection with the means for securing the end of the yarn which constitutes the end bunch.

It has been stated previously that traverse cam 44 initiates movement of the traversing means of the bobbin winding mechanism. In this connection a traverse rod 105 is provided to span the area between casing 2 and outboard bracket 5, the outboard bracket 5 serving as the support for one end of the traverse rod. The distil end of the traverse rod is pierced through the forward wall of casing 2 and projects inwardly thereof terminating beyond cam 44. Traverse rod 105 is connected to traverse cam 44 on spindle 40 by means of a roller 106 journalled on a stud 107 (FIG. 4) and engaged in the helical groove of the cam. The stud is suitably connected with the traverse rod 105 through a sleeve 109 which engages the stud and is connected to the traverse rod. In means fully described in the prior cited patent, the traverse rod 105 serves to feed a yarn guide 125 therealong in building the bobbin with over-lapping longitudinally-advanced conical chases of yarn as is the usual method of winding weft or filling for use in the shuttles of looms.

The yarn guide 125 is not mounted directly on the traverse rod 105 but is carried by a slidable member 130 which is bored to receive a rod 131 for slidingly mounting it thereon. The rod 131 is held at its outer end in tail stock bracket 70 while its inner end passes through a bore in the end wall of casing section 3. It will be appreciated that as yarn guide 125 is advanced by its engagement with traverse rod 105 in the manner explained in the cited patent the yarn guide will also slide along rod 131.

As best seen in FIGURE 1 two additional shafts are provided, both of which extend parallel to the aforesaid shaft rods 105 and 131. Thus, a shaft 163 is provided for mounting a pair of grip arms, only one of which is illustrated herein at 246. Shaft 163 is operative to perform during the bobbin donning operation of the automatic winding mechanism. A further rod 608 extends through the end wall of casing section 3 and terminates at its outer end in tail stock bracket 70. Rod 608 carries a wire loop or breakage lever 615 of inverted U-shape with its upper horizontal cross bar disposed in position to adapt the yarn Y to draw downwardly thereacross as it feeds the winding position. Should the yarn break or its supply be exhausted the breakage lever 615 will be released to swing outwardly thereby rocking the rod 608 to actuate certain mechanisms as set forth hereinafter in order to stop the winding operation.

The parts of the machine thus far described and their functions are the same as in the previously identified patent, except for modifications to be explained hereafter, and reference may be made to that patent for a more complete description thereof. The interrelationship of these parts with those of the instant invention will become obvious from the description hereinafter. It will be appreciated that the afore-described parts per se are not necessary to the present invention but provide a convenient source of motion for driving certain of the operative parts of the invention. The motivation of the parts of the invention could, of course, be accomplished independently of the elements set out hereinbefore of the patented machine. However, as stated earlier the present invention was designed in conjunction with the apparatus of the patent and the foregoing description will, therefore, at least facilitate an understanding of the preferred context in which the present invention is utilized.

*Means for shifting the supply yarn to the end bunch winding position*

The description will now be directed toward the novel features of the present invention. As can best be seen in FIGS. 1–3 and FIG. 7 an elongated flat plate 20 is fastened to the upper portion of outboard bracket 5 by a pair of screws 22 which pass through an extended slot in plate 20 to afford adjustment of the plate. Plate 20 is cantilevered from outboard bracket 5 toward casing 2 terminating somewhat beyond the inner terminal end of and above chuck 67. As will be evident hereafter plate 20 serves as a mounting support for the several elements next to be described.

The inner end of plate 20, i.e., the end of plate 20 protruding inwardly toward casing 2 and beyond outboard bracket 5 is offset to lay in a plane upwardly of and rearwardly of chuck 67 thereby providing a plate section 24. An upstanding tab 26 is mounted on this offset section 24, see FIG. 7. A double ended arm 28 is rockably attached to tab 26 by means of a stud 30. One section of arm 28 projects as a rear finger 28′, being provided on its outer end with a hook or catch 34. In a similar manner a further finger 28″ of arm 28 projects forwardly and has a downwardly projecting catch 38.

A standard 50 is also supported on plate section 24. This standard is rotatable about a pin 52 pierced therethrough and embedded in plate 24. A folded over portion 50′ of member 50 serves to hold one end of laterally projecting yarn engaging finger 54. Yarn engaging finger 54 extends from member 50 into the vertical plane of bobbin B and, as will be discussed further hereinafter, finger 54 acts to seize the yarn at the terminal point of the supply yarn delivery to the service winding and advance the yarn strand to the apical zone of the bobbin where the secondary winding or end bunch E is to be wound. Finger 54 has a bight at 56 which serves, in effect, as a first yarn guide to position the supply yarn and direct it onto the bobbin to form the end bunch.

Figure 2:
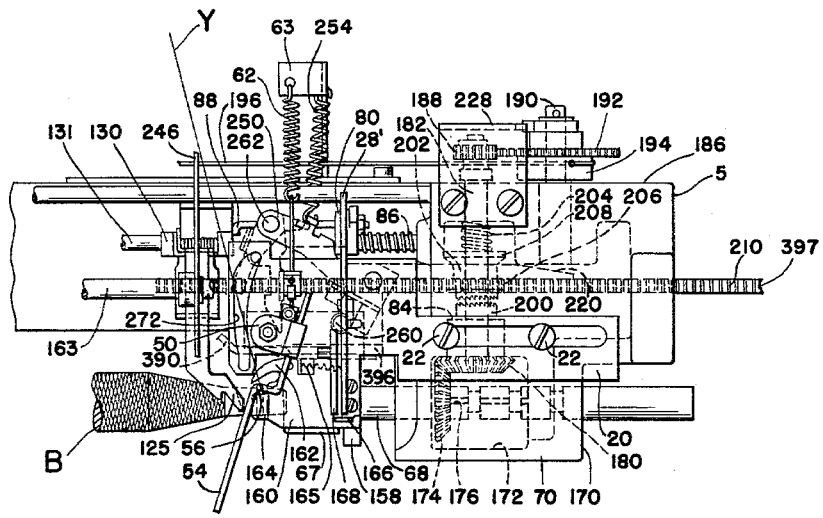
FIG. 2 is an enlarged detail plan view of a portion of the mechanism of FIG. 1 illustrating certain parts of the end bunch winding mechanism.
Figure 7:
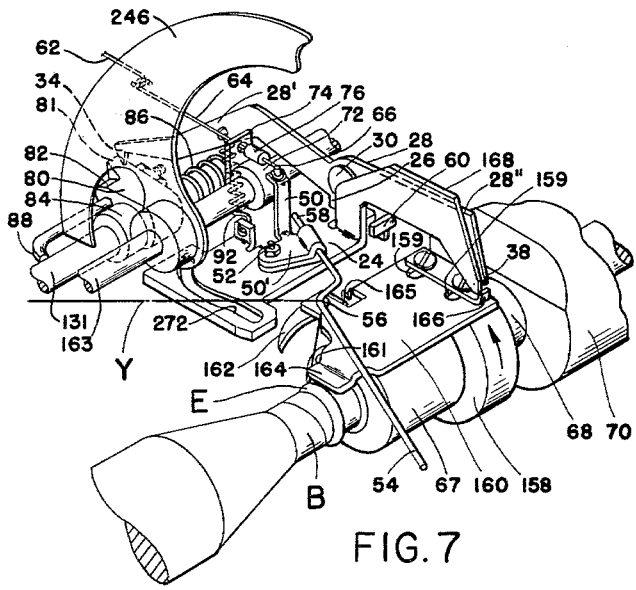
FIG. 7 is a perspective view showing certain of the details of the arrangement of the loopmaking parts after the end bunch has been formed and prior to the securing of the outer end of the end bunch.

As best seen in FIGS. 1, 2 and 7 the inner end of finger 54 projects through the folded over portion of member 50 so as to provide a short stub end 58. A detent 60 constituted as an ear folded horizontally away from the plane of finger 28 extends toward member 50 and actually projects into the rotatable path of stub end 58. Therefore, end 58 may be engaged behind detent 60 in order to hold finger 54 in an inactive position whereby the long axis of the finger is substantially parallel with that of bobbin B. Upon release of stub end 58 finger 54 can pivot counterclockwise (FIGS. 1, 2 and 7) by rotation of member 50. For purposes of biasing member 50 in this counterclockwise direction a spring 62 is provided which is connected through a short rod 64 to a pin 66 protruding from the upper end of member 50. The opposite end of spring 62 is secured to a suitable tab 63 extending from the winding mechanism. With the spring 62 stressed between the two elements as described it will be obvious that upon disengagement of detent 60 from finger 54 the finger will be biased abruptly in a counterclockwise direction by spring 62.

Shaft 163 has already been alluded to as constituting a part of the automatic winding mechanism of the cited patent and, more particularly, being associated with the doffing and donning means of this mechanism. A collar 72 is secured to shaft 163. A tab 74 is affixed to collar 72, this tab extending upwardly from shaft 163 and being provided in its upward region with a hole of enlarged diameter through which the rod 64 is passed, see FIG. 7. A further cylinder-like collar 76 is affixed to rod 64 between tab 74 and stud 66, the diameter of this collar being greater than that of the hole through tab 74. It will be seen that as shaft 163 is rocked clockwise as viewed in FIG. 7 during the bobbin donning operation, in the manner fully related in the prior cited patent, tab 74 will contact collar 76 and push member 50 in a clockwise direction. Finger 54, secured to member 50, will, of course, similarly swing clockwise. In consequence thereof finger 54 can be returned to its previously described inactive position.

It will be appreciated that swinging movement of finger 54 to its active position, i.e., with the long axis of the finger generally normal to the longitudinal axis of bobbin B, (FIGS. 2 and 3) serves to shift the supply yarn strand Y to the position for placement of the end bunch E due to the fact that in the course of its sweeping motion it encounters the supply yarn and carries it along therewith, the yarn sliding down the finger until it comes to rest in the bight 56. As before related detent 60 acts to restrain finger 54 in its inactive position. The release of finger 54 from detent 60 is effected by rocking movement of arm 28. To this end a latch member 80 provided with a projecting tooth 81 and a clearance step 82 is supported on rod 131. The region of rod 131 on which latch member 80 is carried is flatted and, similarly, the bore of latch member 80 is D-shaped to mate cooperatively with its mounting shaft. Thus, latch member 80 is adapted to slide longitudinally of rod 131 and, yet, is prevented from independent rotational movement thereon. The limits of the longitudinal movement of latch member 80 on rod 131 are defined, at one extreme, by a ring 84 mounted fast on the rod and at the other extreme by the wall of outboard bracket 5. When latch member 80 abuts against ring 84 tooth 81 lies in the vertical plane of finger 28' so that catch 34 may engage therewith. A compression spring 86 surrounds rod 131 between latch member 80 and the wall of outboard bracket 5 to yieldably bias the latch member against ring 84.

Axial displacement of latch member 80 along rod 131 toward outboard bracket 5 is achieved by the motion of slidable member 130 as previously referred to. An abutment finger 88 projects laterally from latch member 80 and extends parallel to rod 131 for some distance in alignment to communicate with slidable member 130. As related in the patent earlier referred to, during the latter part of the traversal movement of slidable member 130 near the completion of the building of the service wind on the bobbin B slidable member strikes against the outer end of abutment finger 88. This action causes axial displacement of latch member 80 along rod 131. In the prior cited patent there is, further, fully related the operation of rod 131 whereby this rod is rocked or rotated in order to actuate the doffing and donning means and the elements of the automatic mechanisms of the automatic winding machine. In the present embodiment a helical spring 90 is employed to rock rod 131 clockwise, FIG. 5. Spring 90 is engaged at one of its ends in the lower end of an elbow-shaped lever 517, the purpose of the lever being set forth in the cited patent. The other end of spring 90 is secured to a lug 91 fixed in the side of section 3. During the winding cycle rod 131 is held against rocking movement by virtue of tooth 81 of latch member 80 being engaged with catch 34. However, as has been described, this tooth is removed from the grasp of catch 34 toward the end of the winding of the service wind. In consequence thereof spring 90 acts through lever 517, further described in the earlier cited patent, to rotate rod 131 counterclockwise (see FIG. 5), thereby pulling tooth 81 downwardly. The clearance step at 82 affords a surface on which the catch 34 slides along during this downward movement of rod 131. Thus, as the catch leaves its engagement with tooth 81 latch member 80 is abruptly rocked downward. Catch 34 strikes clearance step 81 and, as the latch member 80 swings downwardly, the catch rides up along step 82 and onto the upper surface of the latch member. Catch 34 is biased during its afore-described movements by a spring 92 one end of which is pierced through finger 28' and the opposite end of which is connected to a tab in plate section 24. Directing attention to U.S. Patent 2,763,443 again, there is described therein means for relocating the yarn guide 125 in its initial winding position toward casing 2. As a consequence of this relocation of yarn guide 125 the force of this guide against abutment finger 88 is relieved and latch member 80 is returned to its initial position against ring 84 under the force of spring 86. At this point, however, catch 34 will be situated upwardly of tooth 81, in the position of FIG. 7, the rod 131 at this time remaining in its downwardly rocked position.

It has been stated earlier that finger 54 is under the control of detent 60. In response to the downward movement of finger 28' in cooperation with movement of catch 34 as just related the detent 60 is swung upwardly. This results in the finger 54 being released from detent 60 whereupon the finger is swung counterclockwise or downwardly as viewed in FIG. 1 by spring 62, the step 82 affording clearance for this movement. It will be recalled that the downward motion of catch 34 and finger 28' occur at the end of the formation of the service wind. Hence, yarn Y will be, at the time finger 54 is released from detent 60, positioned in the path of said finger. Thus, the yarn Y will be moved axially of bobbin B to a position for placement of the end bunch on the bobbin.

Means for controlling end bunch size

It is to be understood that as the completion of the formation of the service wind is attained and the yarn is shifted to the position for placement of the end bunch, bobbin B is maintained in a continuously rotating state. Rotation of the bobbin is continued for a sufficient time to permit the winding of a preselected number of yarn wraps on the bobbin to constitute the end bunch E whereafter rotation of the bobbin is stopped and the terminal yarn end is secured onto said end bunch. In this fashion the size of the end bunch is controlled.

Figure 4:
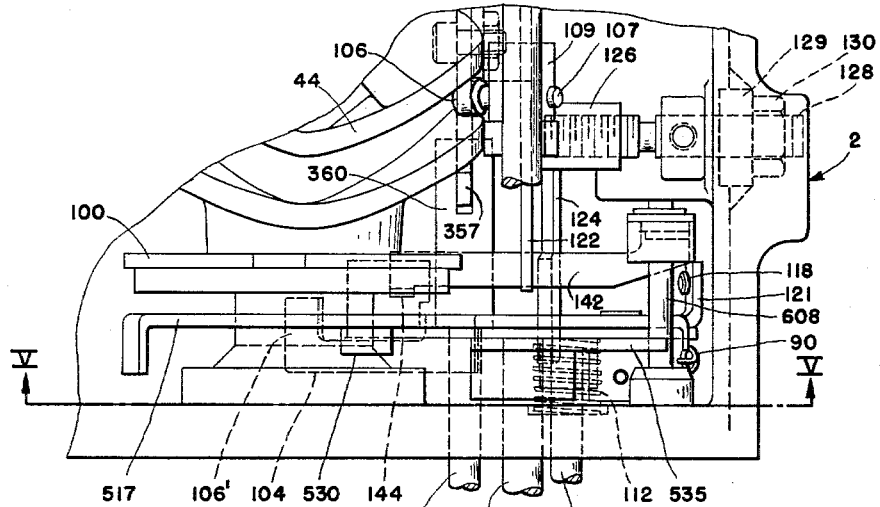
FIG. 4 is an enlarged detail plan view showing a portion of the casing containing the driving means for the winding elements and the end bunch winding mechanism together with the means for controlling sizing of the end bunch.

Turning now to FIGS. 1, 4 and 5 it will be seen that within casing 2 there is contained a flange-like volute cam 100 affixed to the forward end of cam 44 for rotation therewith. The operation of cam 100 in cooperation with further instrumentalities next to be described provides the means for regulating the number of rotations of bobbin B, thereby controlling the size of the end bunch. A stub shaft 102 is pressed into the side wall of bottom section 3 (FIG. 4) and projects inwardly for some distance parallel to shaft 40. A follower lever 104 is positioned for slidable and rotatable movement on shaft 102. As best illustrated in FIGS. 4 and 5 follower lever 104 extends from stub shaft 102 toward cam 100 terminating in a right angular finger 106′ which lies in the plane of shaft 40 and projects toward the spiral groove of volute cam 100 for engagement therewith. The upper rear corner of follower lever 104 is squared off to define an abutment 108 which is positioned in the horizontal plane of tab 110 projecting laterally from the lower end of lever 517. A spring 112 surrounds shaft 102 and is compressed between a wall of bottom section 3 and one side of follower lever 104 for biasing the follower lever toward cam 100.

Situated below follower lever 104 and its mounting shaft 102 is a rod 350 which extends from within casing 2 and protrudes through the wall of the bottom section 3 thereof to terminate in tail stock bracket 70. The function of rod 350 is fully explained in the patent referred to earlier. However, briefly, rod 350 is normally latched in an inactive position and, upon release, moves to an active position by axial movement thereof to effect separation of chuck 67 and the apical end of bobbin B. By this means bobbin B is doffed from the winding mechanism. In the present invention the detention means for restraining axial movement of rod 350 is constituted as a detent lever 116 secured for rocking movement about a stud 118 pierced through the lever and embedded in a cleat 121. Detent lever is provided with a concavity generally midway along its length for accommodating rod 350. As related in the cited patent, rod 350 is connected with an enlarged coupling member 360 which, in turn, is joined with an adjusting link 357 for controlling the effective stroke of rod 350 in the manner as set forth in the patent. Normally, the enlarged diameter shoulder of coupling member 360 is restrained against the side of detent lever 116 (FIGS. 4 and 5), the coupling member being freed from such restraint upon downward rocking movement of detent lever 116. In consequence thereof rod 350 and its attached coupling member 360 together with link 357 shift forwardly toward outboard bracket 5. In order that the rockable detent lever 116 may be under continual bias clockwise to engage rod 350 a spring 119 is connected at one of its ends to an appendage of lever 116. The opposite end of spring 119 is connected to the end of follower lever 104 remote from finger 106. By this arrangement spring 119 serves the further purpose of urging follower lever 104 in a clockwise direction about stub shaft 102.

Link 357, connected to rod 350 through member 360 provides the means for supporting a U-shaped member 120 (FIG. 5), the upper portion of which is formed as an elongated push-bar 122 (FIGS. 4 and 5) extending forwardly toward one side of follower lever 104. As will be explained more fully hereinafter push-bar 122 functions during the resetting operations of the end winding control means.

With continued reference to FIGS. 4 and 5 it will be seen that an elongated element which may be referred to appropriately as an end bunch sizing link 124 floats loosely at one of its ends in a horizontal position projecting between follower lever 104 and detent lever 116. The opposite end of end bunch sizing link 124 is fastened to a sleeve 126 threadedly engaged with the inner end of an adjusting screw 128. In turn screw 128 is threaded through a boss 129 in the wall of lower section 3 of casing 2. The outer end of adjusting screw 128 is slotted in order to accommodate a suitable instrument for rotation thereof to thereby fix the position of end bunch sizing link 124 relative to follower lever 104 and detent lever 116. As is readily apparent in FIG. 5, follower lever 104 and detent lever 116 lie at an acute angle to each other. One end of end bunch sizing link 124 slides between these two elements as adjusting screw 128 is rotated, the link 124 being set in a pre-established position therebetween. A check nut 130 on adjusting screw 128 locks the link 124 in place. Thereupon, end bunch sizing link 124 serves as the driving member to transmit the counterclockwise or downward motion of follower lever 104 to detent lever 116. Obviously, the closer end bunch sizing link 124 is set to the apex of the afore-mentioned acute angle defined by levers 104 and 116, i.e., the further link 124 is advanced toward cam 100, the sooner the counterclockwise or downward motion of follower lever 104 will be transmitted to detent lever 116, thereby effecting coincident downward movement of the lever 116. In consequence thereof the size of the end bunch E may be controlled by regulating the release of rod 350 and coupling member 360 from detent lever 116.

*Method of operating the end bunch sizing means*

In operation the afore-described end bunch sizing mechanism is initiated in response to clockwise rotation of sizing rod 131, the initiation of the clockwise motion having been described earlier in connection with the means for shifting the yarn to the end bunch position. In response to the clockwise movement of sizing rod 131, lever 517, which is secured on rod 131, is also rocked clockwise thereby raising tab 110 from its position interfering with abutment 108 of follower lever 104. Thereupon spring 112 urges follower lever 104 slidably toward cam 100 until finger 106′ becomes engaged with the spiral track of said cam. It will be recalled that cam 44 and its adjunct cam 100, are continuously rotated. Thus, with finger 106′ engaged in the spiral cam 100 lever 104 is driven counterclockwise about shaft 102 downwardly toward detent lever 116. End bunch sizing link 124 is struck by detent lever 104 as this lever swings through its downward path. As already pointed out, the position of link 124 relatively to levers 104 and 116 will control the moment of such contact. It will become evident that the closer link 124 is to the theoretical base of triangle defined by levers 104 and 116, that is to say, the closer link 124 is to the wall 123 of casing section 3, the longer it will take lever 104 to contact it and the greater will be the time during which the end bunch is permitted to build and, consequently, the larger the bunch will be. Thus, the relative position of link 124 to levers 104 and 116 controls the size of the end bunch E.

In consequence of the coincidental counterclockwise movement of detent lever 116 about its supporting stud 118 rod 350 is released for axial movement toward outboard bracket 5 to release bobbin B from its driving connection in the manner fully described in the cited patent whereupon the bobbin ceases rotation with an end bunch of predetermined size formed thereon.

*Method of resetting the end bunch control means*

It has been stated that pusher-bar 122 is affixed to link 357 which, in turn, is movable integrally with rod 350. Thus, as rod 350 slides axially forward upon its release from detent lever 116, pusher-bar 122 is similarly shifted forwardly against the side of follower lever 104, this motion serving to push finger 106′ out of the spiral track of cam 100 against the force of spring 112. At the time of release of finger 106′ from its engagement with cam 100 spring 119 rocks follower lever 104 clockwise or upwardly about shaft 102 until the outer end of the follower lever abuts against the hub of cam 100 as shown in FIG.

5. Follower lever 104 is held in the aforedescribed forward position by push-bar 122 until a lever 535 mounted fast on grip arm shaft 163 is rocked counterclockwise in response to like motion by the grip arm shaft in the manner set out fully in the prior cited patent. As lever 535 rocks counterclockwise it strikes a plate or lug 530 projecting laterally from lever 517 thereby driving lever 517 and sizing rod 131 counterclockwise. In consequence thereof tab 110 is rocked downwardly in the horizontal plane of abutment 108. Thereafter rod 350 is returned to its rearward position by means related in the cited patent. This rearward motion of rod 350 causes push-bar 122 to move similarly rearward thereby withdrawing its force on the side of follower lever 104. In turn, lever 104 is thereupon returned to its restrained position against tab 110 under the biasing force of spring 112. Moreover, as rod 350 and its associated coupling member 360 move rearwardly detent lever 116 jumps off the enlarged diameter of coupling member 360 and is biased against rod 350 by spring 119 whereupon detent lever 116 serves to again effectively restrain the rod in its rearward or inactive position.

Stop motion for the winder

Referring to FIGS. 1, 4 and 5, means are provided for arresting the winding operation through the release of detent lever 116 which holds the rod 350 constrained in order to keep the spindle driving means engaged. As shown in FIG. 1 breakage rod 608, referred to in the cited patent, projects through the side of casing 2, the inner end of this rod terminating within the casing. The distal end of rod 608 is received within a suitable bore in tail stock bracket, this latter mounting not being illustrated herein but being fully described in the cited U.S. patent. As has been alluded to earlier, rod 608 is provided with a breakage lever 615 (FIG. 1). Upon breakage or exhaustion of the supply yarn the breakage lever 615 will be released to swing outwardly, thereby rocking rod 608 clockwise (FIG. 5).

Within casing 3 a pendant 140 is mounted fast on rod 608 for rotation therewith. The lower end of pendant 140 has one end of an angular arm 142 loosely riveted thereto. The distal end of arm 142 has a lug 144 which is slidable on the upper face of a horizontal anvil 146 formed on the outer end of detent lever 116.

It will be seen best from FIG. 5 that the volute cam 100 has an enlarged flange on its outer periphery which is slashed so as to define a shoulder 148 therein. As the winding cycle of the mechanism progresses arm 142 is held in the position of FIG. 5 whereby its extreme end carrying lug 144 is out of the path of contact with shoulder 148. However, upon interruption of the supply yarn as by breakage or exhaustion and in consequence of the concomitant clockwise rotation of rod 608, pendant 140 is rocked to advance arm 142 so that lug 144 is carried into the rotative path of shoulder 148. As shoulder 148 strikes arm 142 the force is transmitted to detent lever 116 which, in turn, is pushed downward or counterclockwise, see FIG. 5. Rod 350 is thereupon released from restraint by the detent lever and will move forwardly as earlier described to stop rotation of bobbin B.

When rod 608 is rocked counterclockwise once again, as when the yarn break is repaired as a fresh supply of yarn is introduced to hold the breakage lever 615 in its upward position, arm 142 will be withdrawn to its position of FIG. 5. Sequentially thereafter, rod 350 will be moved rearwardly as explained in the cited patent as a winding of the bobbin is recommenced and detent lever 116 will rock upwardly under the influence of spring 119 to once again restrain the rod 350 in its inactive position.

Drive for the yarn and securing means

Referring now to FIGS. 1, 2, 3 and 7 through 12 it is seen that spindle 68 has a collar 158 affixed thereon adjacent chuck 67. Collar 158 supports a flat plate or loopmaker 160 thereon by suitable screws which pass through elongated slots 159 in the loopmaker. By this means loopmaker 160 is longitudinally adjustable with respect to collar 158. In a manner to be more fully explained hereafter loopmaker provides an ancillary guide for the supply yarn advancing onto end bunch E and is instrumental in determining the axial location of the end bunch on the bobbin. The loopmaker, when in its inactive position, rests horizontally on collar 158. The end of loopmaker 160 remote from its point of attachment on collar 158 is formed as a tongue or bill 164 of reduced width, said tongue being bent slightly downward from the plane of the loopmaker 160 and laying in the vertical plane of the apical end of bobbin B where the end bunch is to be wound. By virtue of the reduced width of bill 164, as contrasted with the principal portion of loopmaker 160, a shoulder or notch is formed along the conjoining sides thereof at 161. Viewing FIGS. 8–12 it will be seen that loopmaker 160 is situated horizontally between yarn advancing finger 54 and the apical section of bobbin B as the loopmaker lays in its inactive position. Since the loopmaker is thus positioned notch 161 thereof provides an ancillary yarn guide for directing the course of the supply yarn which is advanced to wind the end bunch. Thus, as the supply yarn is moved from the terminus of the service wind to the position for winding the end bunch the yarn slides along yarn engaging finger 54 until it becomes engaged in bight 56 of the finger. At the same time, the yarn is caused to pass along the rear edge of bill 164, thereafter coming to rest in notch 161 in its intermediate run between loopmaker 160 and bobbin B. Thus, as the yarn is wound to form the end bunch it slides successively over bight 56 of yarn engaging finger 54 and against notch 161.

It will be evident that the foregoing arrangement provides the means for selecting the position at the apical end of the bobbin for placement of the end bunch. Prior to commencing a winding cycle, loopmaker 160 may be slid axially relative to bobbin B by virtue of slots 159 to dispose notch 161 in alignment with the position on the bobbin at which the end bunch is to be wound. Subsequently, the notch will act to hold the supply yarn in the selected position to cause the end bunch to wind on the bobbin at that location.

A cam finger 162 is rotatably pinned to the rear edge of loopmaker 160 in a position to lay rearwardly of and spaced slightly from bill 164. A relatively weak spring 165 biases finger 162 counterclockwise (FIGS. 7 and 8) to its open position. The screws which hold loopmaker 160 in place also serves to secure an L-shaped latch 166 in place, the shorter leg of the latch projecting upwardly to engage with catch 38 and a generally crescent-shaped fixed stop 168. Fixed stop 168 is supported on the surface of plate 20 and extends forwardly into the path of latch 166, the fixed stop being juxtaposed with finger 28″.

It has already been explained that spindle 68 is slidable in suitable bearings mounted in tail stock bracket 70. Viewing FIGS. 1 and 2 it will be seen the tail stock bracket 70 overhangs outboard bracket 5 and is constituted generally as a pair of spaced bearing supports 169 and 170 joined together by a suitable web whereby a cavity 172 is defined in the general mid-portion of the bracket 70. A bevel gear 174 is carried on spindle 68 within the confines of cavity 172. An elongated keyway 176 is formed in the diameter of spindle 68. Bevel gear 174 has a suitable mating key, not shown, engaged in keyway 176 thereby affording axial movement of spindle 68 with respect to the bevel gear which, at the same time, permitting the bevel gear 174 to drive spindle 68. The inner wall of bearing support 169 serves to prevent movement of bevel gear 174 in a direction toward chuck 67.

Mating with bevel gear 174 is a companion bevel gear 180 affixed on one end of a cross-shaft 182. By virtue of its engagement with gear 180, bevel gear 174 is prevented from axial movement toward the outer end of shaft 68. Shaft 182 is supported at one of ends for rotation in a suitable bearing in a hub 184 adjacent the forward end of this shaft. The distal or rear end of cross-shaft 182 is rotatably journalled in the rear wall 186 of outboard bracket 5. As illustrated in FIGS. 1 through 3 and 6 the rearmost end of cross-shaft 182 projects outwardly of wall 186 and has a spur gear 188 securely affixed thereto.

A stub shaft 190 is embedded in the wall 186 parallel with cross-shaft 182. The outer end of stub shaft 190 has a pinion 192 mounted rotatably thereon and engaged with spur gear 188. Pinion 192 is provided with an integral hub 194 having a rather broad peripheral surface to which is connected one end of a flexible cable 196. The opposite end of cable 196, in turn, is attached to one end of a tension spring 198. The remote end of spring 198 is engaged in a cleat 199 protruding from the rear side of casing 2.

With attention again to FIGS. 1 and 2 a saw-tooth clutch member 200 is affixed securely on cross-shaft 182 for rotation therewith. A mating saw-tooth clutch member 202 is situated slidably on cross-shaft 182 and is biased axially toward a position of engagement with clutch member 200 by a compression spring 204 which surrounds the cross-shaft 182 in a compressed state between the rear side of clutch member 202 and the rear wall 186 of outboard bracket 5. Clutch members 200 and 202 thereby constitute a "one-way" positive clutch. For purposes yet to be explained clutch member 202 has a spur gear 206 formed integrally therewith at one of its sides. A relatively large diameter flange 208 is also formed integrally with clutch member 202, a channel or recess being defined around the diameter of clutch member 202 between the said flange 208 and gear 206.

In the U.S. patent referred to earlier herein there is described a rack-bar 397 and its operation in connection with the automatic winding mechanism disclosed therein. Briefly, rack-bar 397 is mounted to slide in a slotted bearing, not herein illustrated, formed in the upper rail 210' of outboard bracket 5. As described in that patent rack-bar 397 is driven by a gear (not shown) the teeth of the rack-bar 397 being, of course, on the lower surface of the rack-bar for engagement with the aforesaid driving gear. In the present invention the structure and arrangement rack-bar 397 is substantially the same as that disclosed in the cited patent. However, the rack-bar 397 is provided with a series of teeth on its upper surface as at 210. Rack-bar 397 is positioned to slide beneath below the axis of and engaged with spur gear 206, whereby movement of the rack-bar imparts rotation to clutch member 202 which, as has already been indicated, is integral with the spur gear.

Rack-bar 397 is described in U.S. Patent 2,763,443, previously referred to, as supporting an angular plate 396 to which is attached a yarn retriever 390, the purpose of the yarn retriever in the structure of that patent being, broadly stated, to carry the yarn stranded into position for fastening its end to a fresh bobbin to be wound. In the present invention plate 396 has an elongated sword-like cam-bar 220 (FIGS. 1 and 2) formed therewith. This cam-bar 220 is disposed against the side of rack-bar 397 and is slidable therewith. Moreover cam-bar 220, by virtue of its alignment with rack-bar 397, is positioned to enter between gear 206 and flange 208 as rack-bar 397 slides outwardly, i.e., to the right in FIGS. 1–3, thereby bearing on flange 208 and camming clutch member 202 out of engagement with clutch member 200.

Figure 6:
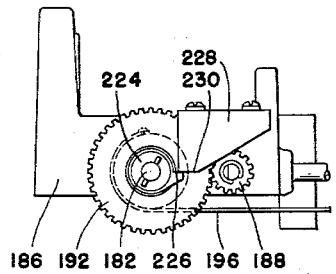
FIG. 6 is an elevational view of the means for controlling the cycling of the loopmaking mechanism of the invention.

Turning now to FIG. 6 it will be seen the pinion 192 is provided with an arrangement for regulating its degree of rotation. Thus, a disc 224 having a radially projecting tooth 226 is securely attached on the outer end of cross-shaft 182. A right-angle bracket 228 is fastened to the upper surface of outboard bracket 5. This bracket has a shoulder formed therein constituting stop 230. The path of movement afforded pinion 192 by stop 230 is such as to permit slightly more than two full revolutions of gear 188. In turn, gear 188 serves to impart this rotative motion through the power train of cross-shaft 182, clutch members 202 and 200, bevel gears 174 and 180, and shaft 68 to revolve loopmaker 160 through generally two full revolutions for securing the yarn end of the end bunch as will subsequently be explained.

*Method of operating the yarn end securing means*

Assuming that a bobbin has been fully wound with yarn, and the end bunch has been wound on the bobbin, arm 28 will have been rocked counterclockwise by spring 92 as earlier related to raise catch 38 out of engagement with latch 166, thereby leaving stop 168 as the restraining element for loopmaker 160. Forward movement of rod 350, upon its release in the manner already recited, causes chuck 67 to shift to the right (FIGS. 1 and 2), i.e. away from chuck 65. It is fully discussed in the cited patent that rod 350 is moved in the first instance to only a slight extent for releasing the pressure of chuck 67 on the tip end of the wound bobbin B, resulting in the pressure of the butt end of the bobbin against the driver chuck 65 being relieved. This action disengaged bobbin B from its driving clutch to stop the bobbin from rotating. However, the bobbin remains suspended between chucks 65 and 67.

In the series of events now being described rack-bar 397 will commence its movement from near its extreme rightward position, i.e., in the position illustrated in FIGS. 1 and 2. However, prior to its movement to the left to shift yarn retriever 390 toward the butt end of a fresh nude bobbin donned between chucks 65 and 67 rack-bar 397 makes a slight rightward movement as explained in the earlier cited patent. This movement is utilized to impart motion to certain instrumentalities for severing the supply yarn, yet to be described. Further, cam-bar 220 will continue to bear on flange 208 to hold clutch member 202 disengaged from its mating member 200 as cam-bar 220 makes its initial rightward movement, just described. Moreover, cable 196 will, at this time, be wrapped about hub 194 so as to extend and tension spring 198.

With the foregoing parts situated as just related movement of spindle 68 to the right by rod 350 (FIGS. 1, 2 and 7) causes latch 166 to slide from beneath stop 168. It will be appreciated that, at this time, catch 38 will have rocked upwardly away from the plane of interference with latch 166. Thereupon spring 198 acting through cable 196 pulls pinion 192 counterclockwise (FIG. 6) to impart like counterclockwise rotation to spindle 68 and, consequently, loopmaker 160, the loopmaker moving in the direction of the arrow in FIG. 7. This motion is, of course, transmitted to the loopmaker through cross-shaft 182 and bevel gears 174 and 180. It has already been stated that the loopmaker 160 makes generally two full revolutions before being halted, the number of revolutions being controlled by the coaction of tooth 226 and stop 230 as earlier related.

Figure 8:
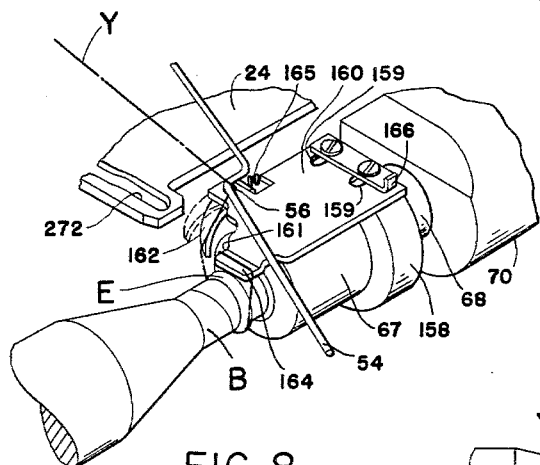
FIG. 8 is a fragmentary perspective view illustrating certain of the loopmaking parts of FIG. 7 in their operative positions after the loopmaking means has completed one revolution.

Now, it will be recalled that finger 54 advances the supply yarn Y axially of bobbin B to a position on the bobbin where the end bunch is to be formed. In so doing the strand, as it extends from the bobbin is drawn into the space between bill 164 of loopmaker 160 and cam finger 162, and bearing against notch 161, such position being illustrated in FIG. 7. With the yarn so positioned the loopmaker 160 is rotated under the influence of spring 198 as earlier described. During the first revolution of loopmaker 160, bill 164 picks up the strand of yarn so that a first raised loop of yarn is created as seen in FIG. 8. This first yarn loop raised on bill 164 is essentially the last loop of yarn wound into the end bunch. The additional yarn necessary to provide the additional circumference of the loop is drawn off the supply. FIG. 8 serves to illustrate the disposition of the yarn at the end of the first revolution of loopmaker 160. From FIG. 8 it will be observed that the yarn strand is situated behind cam finger 162, the rotation of the loopmaker having so positioned the cam finger.

Figure 9:
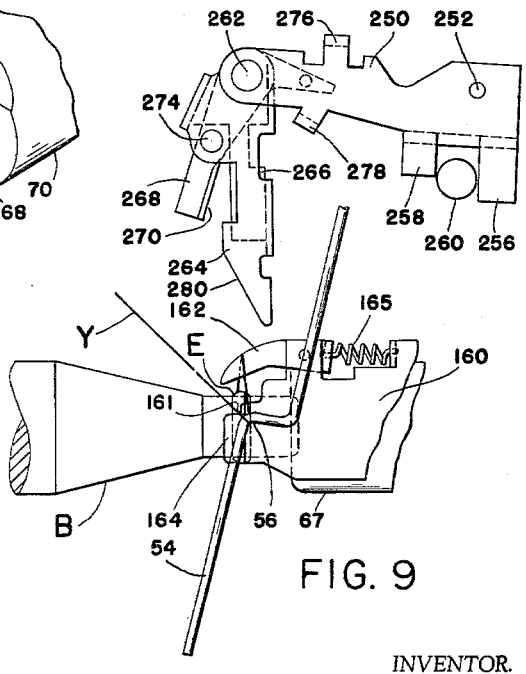
FIG. 9 is a view similar to FIG. 8 but illustrating the arrangement of the parts and position of the yarn after the loopmaking means has completed two revolutions and illustrating the cutting and clamping means prior to engagement thereof with the yarn.
Figure 10:
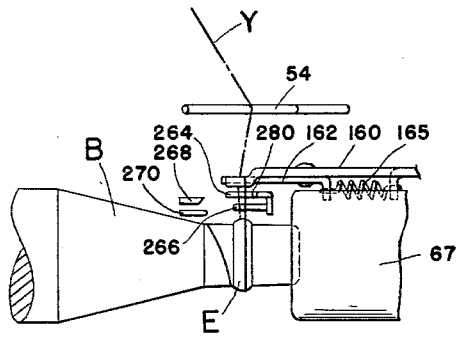
FIG. 10 is an elevational view of the cutting and clamping means showing these parts in position for engaging the yarn end.
Figure 11:
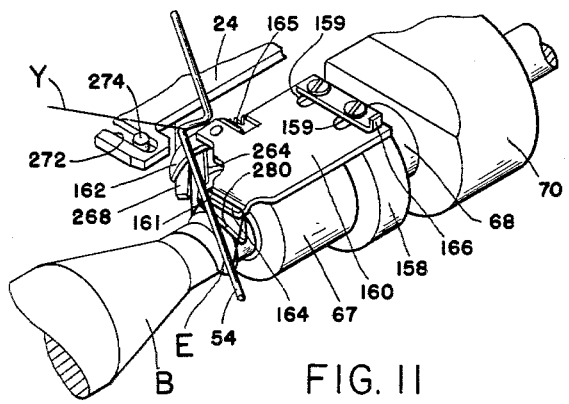
FIG. 11 is a perspective view similar to FIG. 8 but showing the operative position of the cutting and clamping means.

Now, as earlier stated, the loopmaker continues rotating to make a second revolution whereby a second loop of yarn is raised above the periphery of the end bunch, as shown in FIG. 9. In the course of the second revolution of loopmaker 160 bill 164 is generated inwardly into the coils of the end bunch to actually pick up the penultimate or next-to-last loop of yarn wound into the end bunch In the first quadrant of movement of loopmaker 160 as it commences its second revolution cam finger 162 momentarily pushes the strand of yarn extending to the supply rearwardly, thereby clearing it from possible engagement by bill 164. Cam finger 162 releases the yarn strand onto the periphery of the end bunch as spring 165 yields to the force of the tension in the supply strand, the position of the cam finger during this yielding motion being shown by the dotted lines in FIG. 8. Spring 165 returns cam finger 162 to its open position as soon as the yarn loop is slid therefrom. The bill therefore revolves through its second revolution raising the second loop and, coincidently, pulling the afore-mentioned first loop snugly onto the surface of bobbin B or the outer layers or coils of the end bunch. By virtue of the inherent tension caused by the pulling effect of bill 164 the slack yarn which originally contributed to the larger diameter of the first yarn loop is passed to contribute to the increased circumference of the second loop so as to permit this second loop to be raised upwardly of the periphery of the end bunch E as seen in FIGS. 10 and 11. At this time instrumentalities next to be explained are actuated to cam the second yarn loop over the end bunch and sequentially pull this second loop tightly against the final coil of yarn wound into the end bunch to yieldably secure said end bunch E on bobbin B. As a final step in the next sequence of steps the supply yarn is severed.

*Means for reloading the loopmaker*

As the second revolution of loopmaker 160 is completed stop 230 strikes against stop 226. At this time means are actuated as fully set forth in the prior cited patent to shift rack-bar 397 first to the right to a slight extent, as has already been discussed in connection with the operation of the yarn securing means, and then to the left (FIG. 1). The leftward movement of rack-bar 397 serves to move yarn retriever 390 toward the butt end of the bobbin and, further, to rotate gear 206. As a result of this motion cam-bar 220, which is shorter than rack-bar 397, is withdrawn from its contact with flange 208. Thereupon, spring 204 forces cam member 202 into engagement with cam member 200, the gear continuing in engagement with rack-bar 397. Thus, in the course of its leftward movement rack-bar 397 rotates gear 206 to drive cam member 202. In consequence thereof and in generally the latter half of the leftward motion of rack-bar 397 cam members 200 and 202 are drivingly engaged and, by virtue of the fact that cam member 200 is fast on cross-shaft 182, bevel gears 174 and 180 are rotated. Similarly, gear 188 on the opposite end of the cross-shaft is driven clockwise as viewed in FIG. 6 causing cable 196 once again to wrap about hub 194 and spring 198 to be tensioned.

As rack-bar 397 shifts to the left as just stated and bevel bears 174 and 180 are driven to rotate spindle 68, loopmaker 160 is moved clockwise (opposite to the direction of the arrow, see FIG. 7) to reseat latch 166 under catches 38 and 168. At this time loopmaker 160 is rotated in the aforementioned clockwise direction for slightly more than two complete revolutions. During this reverse rotation chuck 67 is still in its withdrawn position, that is to say, it is at its rightward position. Hence, latch 166 is clear of interference with catch 38 and stop 168. However, at the completion of this reverse rotation chuck 67 is permitted to shift leftwardly to grasp a new bobbin in accordance wtih the donning operation as explained in the patent referred to earlier. This motion positions latch 166 in the vertical plane of catch 38 and stop 168, the arm 28 which carries catch 38 having, at this time, rocked counterclockwise (FIG. 7) by motions of rod 131 to engage tooth 81 with opposing catch 34. Additionally, the slight overrun of loopmaker 160 during its reverse rotation is sufficient to bring latch 166 forwardly of catch 38 and stop 168 (FIG. 1). Substantially simultaneously with chuck 67 assuming its forward position engaging the apical end of a new bobbin rack-bar 397 reverses its leftward movement as fully set forth in the cited patent and commences an outward or right-hand movement (FIGS. 1 and 2). By reason of clutch members 200 and 202 constituting a "one way" clutch this outward movement of rack-bar 397 does not rotate gear 206 but, rather, clutch members 200 and 202 slip over each other. Continued outward movement of rack-bar 397 brings cam-bar 220 into engagement with flange 208 to bias clutch member 202 out of engagement with its companion member 202. At this time spring 198 acting through cable 196 and the previously described power train to spindle 68 imparts a slight counterclockwise motion to loopmaker 160 to rock latch 166 into abutment with catches 38 and 168, it being recalled that latch 166 had been said earlier to have slightly overrun the engaged position with said catches during its reverse rotation. Loopmaker 160 is thereupon reloaded preparatory to securing a further end bunch in a succeeding cycle.

It may occur that yarn failure will initiate instrumentalities as set forth in the cited patent to stop the automatic winding machine by movement of spindle 68 to the right for a relatively short distance (FIG. 1) as earlier alluded to herein. In this event it, of course, is not desirable to operate the loopmaker 160. Therefore, as most apparent in FIG. 2, catch 38 is situated so as to continue to engage latch 166. As explained in that patent sizing rod 131 does not rock upon yarn failure. Hence, catch 38 effectively restrains loopmaker 160 from rotating during such yarn failure, whereafter the latch 166 is returned to its position jointly engaged under stop 168 as well as catch 38 when spindle 68 once again shifts to its inward position to cause bobbin B to rotate.

*Yarn end clamping and severing means*

The means for clamping the terminal yarn end from the end bunch and severing it is under the control of the rack-bar 397. It will be recalled that rack-bar 397 has been said earlier to undergo a brief rightward or outward movement (FIGS. 1 and 2) in the manner set forth in the U.S. Patent 2,763,443 at the completion of the winding cycle and prior to its leftward movement to deliver the yarn retriever 390 toward the butt end of a newly donned bobbin. Now, with continuing attention to FIGS. 1 and 2 it will be seen that an elongated lever 250 is rotatably anchored to the lower side of plate section 24 by a stud 252. A spring 254 is engaged at one of its ends in one side of lever 250, the opposite end of this spring being hooked in tab 63. Thereby spring 254 urges lever 250 clockwise about stud 252 as viewed in FIGS. 1 and 2. The end of lever 250 proximate to stud 252 is bifurcated to present a pair of forwardly projecting fingers 256 and 258 generally enclosing an upwardly projecting guide roller 260. In turn, guide roller 260 is firmly embedded in the upper surface of yarn retriever 390. Accordingly, it will be apparent that movement of rack-bar 397, to which yarn retriever 390 is attached, will produce a transmitted pivotal movement to lever 250 through guide roller 260.

With attention now to FIGS. 1, 2, 3 and 9 the outer end of lever 250 remote from its pivot point has a stud 262 pierced therethrough. Stud 262 acts to pivotally support in a position beneath plate section 24 a pair of elongated fingers 264 and 266 and a pair of juxtaposed angular arms 268 and 270. Viewing FIG. 10 it will be seen that fingers 264 and 266 and arms 268 and 270 are disposed in a vertical plane slightly below loopmaker 160 and, further, these fingers and arms are aligned to engage the yarn Y extending beyond the end bunch and supply source. Moreover, viewing FIGS. 10 and 13 it will be apparent that the fingers and arms just referred to are staggered with respect to each other so that finger 264 is uppermost with arm 268 being disposed in a plane slightly below finger 264 to engage therebeneath. Similarly, finger 266 is spaced from finger 264 to admit arm 268 upwardly thereof and, at the same time, arm 270 is lowermost to pass below finger 266. Preferably, fingers 264 and 266 are unitary in construction and, in the same fashion, arm 268 and 270 are constructed as a single U-shaped unit. Thereby, the fingers will move as a single element and, in like manner, the arms will move together. Further, as shown in FIGS. 9 and 10 arm 270 protrudes out slightly beyond the edge of arm 268 for clamping purposes. As will be related in more detail hereafter these fingers and arms cooperatively inter-engage to clamp and cut the yarn from the end bunch.

Figure 3:
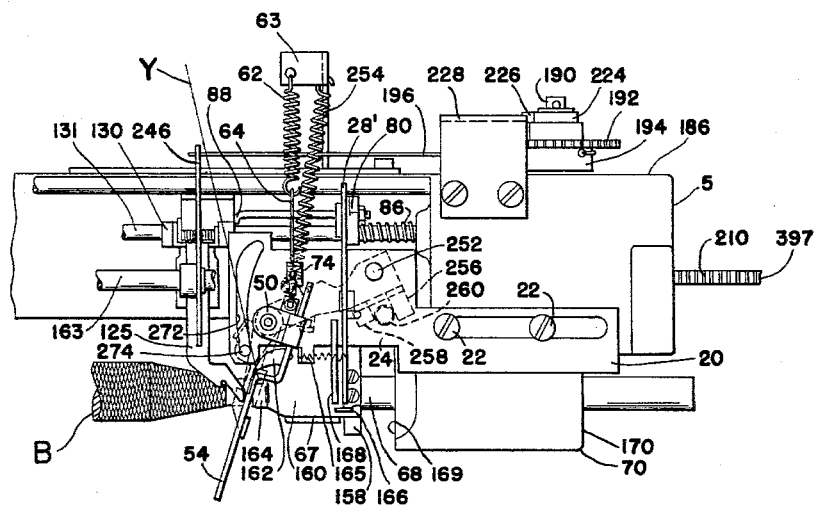
FIG. 3 is a view similar to FIG. 2 and illustrating certain of the parts of the end bunch winding mechanism positioned to sever the end of the supply yarn from the outer end of the end bunch.

Reverting now to FIGS. 1–3 the outmost region of plate section 24 has an extended generally arcuate cam groove 272 formed therein and running substantially transversely thereof. Finger 264 has an upstanding cam follower roll 274 set fast in the upper surface thereof in a position to engage in cam path 272. Additionally, lever 250 has a pair of depending tabs 276 and 278 bent downwardly from its respective rearward and forward margins. The rearward angular sections of arms 268 and 270 extend into the region between tabs 276 and 278 and are, in certain intervals of the operation of lever 250, controlled by said tabs.

Referring to FIG. 9 it will be observed that finger 264 has a bevelled edge constituting a cam 280. This cam provides the means by which the second loop of yarn which is raised by bill 164 is pushed over the end bunch to create a cross-winding overlaying the final coil of yarn of the end bunch. This cross-winding may also overlay a part or all of the body of the end bunch. However, in order that the end bunch may be totally secured the final coil, at least, should be crossed over by this second loop. As seen in FIG. 9, bill 164 is of such length as to project beyond the end bunch, thus assuring that this second loop will overlay the final yarn coil. The second loop is eventually drawn tight to lock the end bunch on the bobbin.

*Operation of the yarn end clamping and severing means*

Figure 13:
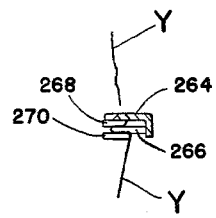
FIG. 13 is a fragmentary elevational view illustrating certain parts of the cutting and clamping means engaged with a yarn end.
Figure 12:
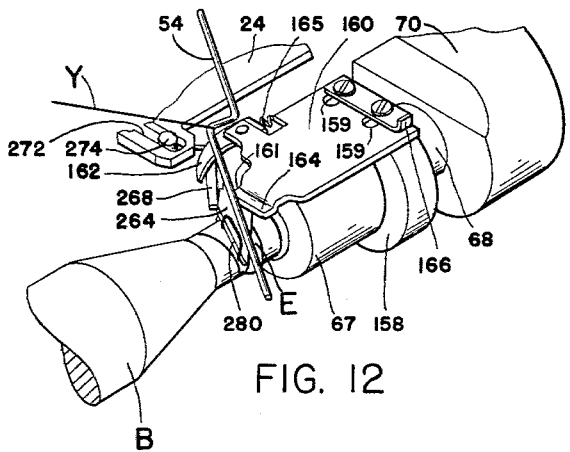
FIG. 12 is a view similar to FIG. 11 but illustrating the camming means in position to displace the final yarn loop of the end bunch.

It has already been pointed out that rack-bar 397 moves somewhat to the right at the end of the winding cycle prior to shifting left as seen in FIG. 1. This brief right-hand movement of rack-bar 397 carries guide roller 260 therewith. In consequence thereof guide roller 260 abuts against finger 256 and causes arm 250 to pivot forwardly about stud 252 against the force of spring 254 to the position of FIG. 3. In the course of this pivoting movement and as shown in the sequence of views from FIG. 9 through FIG. 14 the yarn is clamped and severed. At the commencement of the forward movement of arm 250 the parts assume essentially the relationship of FIG. 9. Fingers 264, 266 are spaced away from arms 268, 270 to provide a space therebetween for the admittance of the yarn strand. During the course of the forward movement of arm 250 cam roll 274, being guided by cam groove 272, causes fingers 264, 266 to swing clockwise as viewed in FIG. 9. As finger 264 advances toward the end bunch cam 280 enters inwardly of the second loop of yarn raised by bill 164 of loopmaker 160. That is to say, the cam 280 enters between the said second yarn loop and chuck 67 as seen in FIG. 10. As a result thereof, this second yarn loop is cammed off the bill, see FIG. 11, and over the wraps of the end bunch, a portion of the second loop lying against the final yarn coil of the end bunch as shown in FIG. 12. Concurrently therewith, finger 264 and its companion finger 266 continue their clockwise movement (FIG. 9) about stud 262 under the influence of cam groove 272 and the associated roll 274 and in response to the forward movement of arm 250. When fingers 264, 266 have advanced forwardly sufficiently to engage the supply yarn strand in the gap between the fingers and arms 268, 270, as shown in FIG. 11 arm 250 will have advanced forwardly sufficiently to cause tab 278 to bear on the rear section of the arms 268, 270. As a result of the cooperative action of cam roll 274 closing fingers 264, 266 toward arms 268, 270 while, at the same time, continuing forward motion of arm 250 causes tab 278 to push arms 268, 270 toward the fingers just mentioned, a scissors-like action takes place between the arms and fingers. As a first incident of the scissor-like motion arm 270, which has been described as projecting somewhat beyond the margin of its companion arm 268, slides beneath finger 266 to clamp the yarn therebetween. Promptly thereafter arm 268, preferably having a sharpened forward edge interdigitates between fingers 264 and 266 to sever the yarn strand as depicted in FIG. 13. The position of the yarn clamping and severing elements in their advanced or operative position is shown in FIG. 3.

Figure 14:
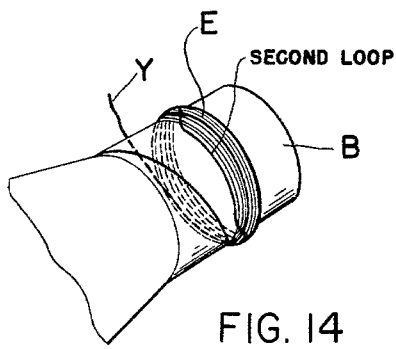
FIG. 14 is a fragmentary perspective view of the apical end of a bobbin showing the end bunch secured in position thereon.

With the yarn clamped and severed as just described rack-bar 397 moves in its opposite direction to return the yarn retriever 390 to the butt of bobbin B as described in the afore-mentioned patent. Advantageously, finger 258 is shortened to afford clearance for guide roller 260 as rack-bar 397 moves toward chuck 65. In the course of such motion guide roller 260 moves out of contact with finger 256 whereupon spring 254 causes arm 250 and the parts supported thereby to retreat to its rearward position under the pull of spring 254, follower roll 274 acting to control the rearward limit of movement of arm 250. It will be appreciated that as fingers 264, 266 and arms 268, 270 move rearwardly the yarn which is clamped therein is not immediately released but, rather, the yarn remains clamped briefly, that is, while the arm 250 retreats through a portion of its arc of movement. In view of this, the second yarn loop is collapsed onto the periphery of bobbin B and is a portion of this second loop pulled tightly against a portion of the final yarn coil on end bunch E to secure the bunch onto the apical end of a bobbin as seen in FIG. 14. Means are fully disclosed in commonly assigned copending application for U.S. Letters Patent S.N. 231,390 filed October 18, 1962 for manipulating the supply yarn Y once it has been severed whereby it is prepared for redelivery to yarn retriever 390.

*Modified loopmaker*

Figure 15:
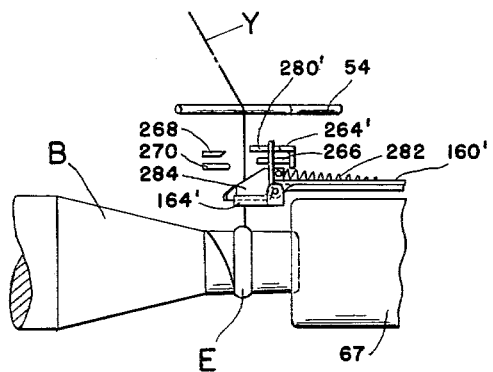
FIG. 15 is a fragmentary elevational view showing a modified form of the loopmaker of the present invention.
Figure 16:
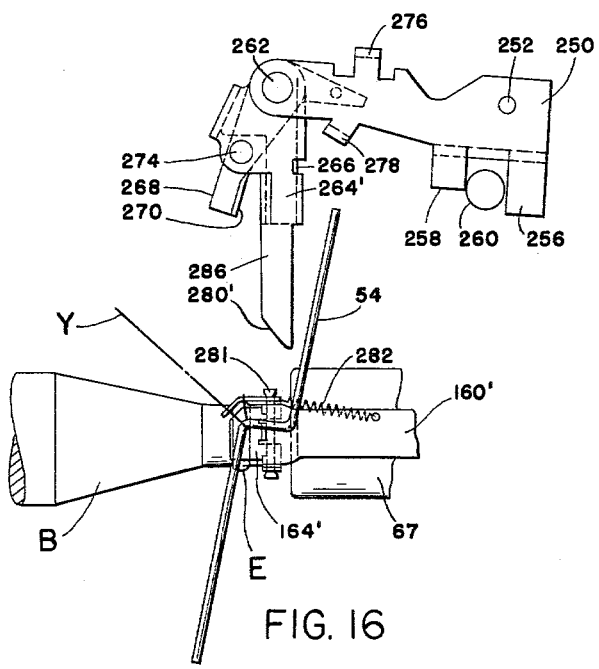
FIG. 16 is a top plan view of the structure of FIG. 15.

Referring to FIGS. 15 and 16 a modified form of the loopmaker of the present invention is illustrated. In the modification a flat plate or loopmaker 160' is supported rearwardly of chuck 67 in the same manner as the earlier described loopmaker 160. The forward end of loopmaker 160' carries a right-angular member constituting a bill 164', this bill being disposed upwardly of and in the plane of the end bunch on the bobbin B. Bill 164' is connected to loopmaker 160' by a pintle 281 so that the tongue can rock downwardly toward the end bunch. A relatively light spring 282 is connected to bill 164' and loopmaker 160' to bias the bill clockwise as viewed in FIG. 15, this biasing movement being limited by the bill abutting the plate 160'. A sloping web or wall 284 is provided along one side of bill 164' to contact the yarn and guide it off the end of the bill.

In FIG. 16 parts of the yarn end clamping and severing means earlier related are shown. These parts are of the same construction and operate in the same manner as the parts earlier described save for the forward end of finger 264. When employed with this modified loopmaker, a finger 264' is provided with an elongated leg 286, the forward end of which is tapered to provide a cam surface 280' generally corresponding to the cam surface 280 of the first described embodiment.

In operation, it can be assumed that loopmaker 160' has completed two full revolutions as described in connection with loopmaker 160 and that the second yarn loop is engaged on bill 164' (FIGS. 15 and 16). Thereupon, finger 264' is advanced toward tongue 164' in response to motion imparted from arm 250. It is to be appreciated that in the course of this advancement the yarn clamping and cutting means is operating in the same manner as with the earlier related embodiment. As a result of the rotation of loopmaker 160' a loop of yarn is wrapped about bobbin B and over the sloping edge of wall 284. Thereafter, as finger 264 advances toward the loopmaker, cam surface 280' enters behind bill 164' (FIG. 15) and tilts the tongue counterclockwise as viewed in FIG. 15 to slide the second loop of yarn off the tongue and over the yarn wraps of the end bunch E, depositing this second loop on the surface of bobbin B. Bill 164' is thereafter rocked back to its initial position by spring 282 when finger 264' is moved rearwardly. The second loop is then drawn tightly to secure to end bunch in place and the supply yarn is severed in the manner already described.

Summary of operation

The manner of operation of the structure of the present invention will be reasonably apparent from the detailed description thus far given and, for that reason, a brief summary of the over-all operation should suffice here.

Toward the end of the formation of the service wind slidable member 130 contacts abutment finger 88 and, with repeated strokes, drives latch member 80 axially outward toward outboard bracket 5. Catch 34 of finger 28' thereby disengages from tooth 81 and rocks downward under the force of spring 92 resulting in the opposite finger, i.e., finger 28" swinging upwardly (see FIG. 7) to disengage catch 38 from latch 166. At the same time sizing rod 131 rocks downwardly or clockwise, FIG. 5. As a further consequence of the upward movement of finger 28" stub end 58 of finger 54 is released as detent 60 on finger 28" is also moved upward. Spring 62 swings finger 54 abruptly counterclockwise (FIGS. 1–3) and, in the course of this motion finger 54 sweeps into engagement with the supply yarn extending between the supply source and the terminal end of the service wind thereby carrying this yarn laterally outward to the apical zone of the bobbin for further winding. The extent of this movement of the supply yarn is limited by engagement of the yarn with bight 56 and notch 161. During this shifting of the supply yarn the bobbin continues to rotate and, as a result, an end bunch E of yarn is applied on the apical end of the bobbin.

The size of the end bunch is controlled through a linkage preset by rotating adjusting screw 128. As a result thereof link 357 is positioned at a desired point between follower lever 104 and detent lever 116. Thereafter as sizing rod 131 is rocked downwardly upon detachment of catch 34 from latch member 80 abutment 108 within casing 2 is raised (FIG. 5) permitting finger 106 of follower lever 104 to engage in the spiral track of cam 100. Continued rotation of shaft 40 causes cam 100 to drive follower lever 104 downward, eventually communicating with end bunch sizing link 124 which, in turn depresses detent lever 116. Rod 350 is thereupon released to move chuck 67 somewhat to the right, FIGS. 1–3, to arrest rotation of bobbin B while retaining the bobbin between chucks 65 and 67.

In the course of this rightward movement latch 166 is slid from beneath stop 168 thereby releasing loopmaker 160 for rotation by the power train acting through crossshaft 182 under the impetus from spring 198. As already described loopmaker 160 revolves twice to cause a loop of yarn to cross over the end bunch and lock the end bunch in place.

In sequence thereafter, rack-bar 397 is moved to the right for a short distance (FIGS. 1–3) to operate the yarn end clamping and severing means. In turn, guide roller 260, connected with rack-bar 397 through yarn retriever 390, is moved to the right in conjunction with like motion of the rack-bar. This movement pivots lever 250 counterclockwise, FIG. 9, to firstly present cam 280 to the second loop of yarn resting on bill 164 at the termination of the second revolution of loopmaker 160. Cam 280 effectively pushes this second loop over the end bunch. Thereafter clamping members constituted as arms 266, 268 grasp the supply yarn end adjacent the end bunch while the severing means, fingers 264, 266 move inwardly to cut the supply yarn. Sequential leftward movement of rack-bar 397 causes guide roller 260 to bear on finger 258 to move lever 250 clockwise as seen in FIG. 9 to cause fingers 264, 266 and arms 268, 270 to retreat rearwardly. Since the end of yarn continues to be clamped between arms 266, 268 during part of the return stroke of these arms the crossed-over second yarn loop is pulled tightly to secure the end bunch E in position.

After the end bunch has been so yieldably fastened on the bobbin the apparatus is reloaded for a new cycle as rack-bar 397 continues its afore-mentioned leftward movement. Clutch member 202 is biased into engagement with its mating member 200 by spring 204. Further movement of rack-bar 397 causes the clutch 200, 202 to rotate crossshaft 182 to wrap cable 196 around hub 194 thereby stressing spring 198. Thereafter spindle 68 carrying loopmaker 160 moves leftward, FIGS. 1–3 to set latch 166 behind catch 38 and stop 168 and, thus, retain the loopmaker 160 in a loaded position.

Grip arm shaft 163 has been said earlier to rock counterclockwise, FIG. 5, during the donning cycle whereby a fresh stripped bobbin is introduced between chucks 65 and 67. During this motion tab 74, affixed on shaft 163, is rocked therewith to push on collar 76. This movement swings standard 50 about until stub end 58 of finger 54 passes beyond detent 60. In timed sequence therewith sizing rod 131 rocks clockwise as viewed in FIG. 4 as stated earlier. This motion raises tooth 81 beneath catch 34, generally pushing arm 28 clockwise about stud 30, see FIG. 7. This depresses detent 60 into the path of stub end 58 of finger 54 to hold the finger in its inactive position essentially parallel to bobbin B. Thereafter, and as explained in the referenced patent, shaft 163 rocks clockwise thereby causing tab 74 to back off from collar 76 so that, upon upward movement of detent 60, finger 54 may be immediately swung outwardly to its active position moving the yarn to the end bunch winding position.

During the foregoing series of events rod 350 is moved rearwardly or to the left, FIGS. 1–3, as already related where it becomes eventually yieldably locked with detent lever 116.

It will be understood by reference to the foregoing specification that the instant invention provides an entirely automatic apparatus for placing an end bunch of yarn on a wound bobbin and locking the end bunch in place without attention on the part of the operator.

While the present invention is herein shown and described as embodied in a preferred form of construction, it is to be understood that modifications may be made to the structure and arrangement of the elements thereof without departing from the spirit or scope of the invention. Therefore, it is intended that all matter contained in the above description or shown in the accompanying drawing shall be interpreted as illustrative and not in a limiting sense.

What is claimed is:

1. A method for applying a separate end bunch of a plurality of coils of yarn on a bobbin having a main winding of yarn wound thereon from a supply yarn comprising the steps of,
    moving said supply yarn from the outer terminus of said main winding of yarn axially of said bobbin to a location for placement of said end bunch,
    winding an end bunch at said location, moving a portion of an inner coil of yarn of said end bunch upwardly of the periphery of the end bunch while maintaining said inner coil within the axial confines of said end bunch, displacing said inner coil portion across said end bunch to overlay at least a portion of the final coil wound into said end bunch, and seizing said supply yarn within the axial confines of said end bunch to draw said final coil and said inner coil against said end bunch to yieldably fix said end bunch in position on said bobbin.

2. The method of claim 1 including the step of arresting rotation of said bobbin at the completion of formation of said end bunch.

3. The method of claim 1 including the step of severing said supply yarn from said end bunch after the end bunch has been wound.

4. The method of claim 1 including the step of controlling the number of coils of yarn wound into said end bunch.

5. Apparatus for forming a separate end bunch of a plurality of yarn coils on a bobbin from a supply yarn as a continuating of a main winding of yarn on said bobbin comprising, means for disposing said bobbin in a winding position, a member for shifting said supply yarn from the outer terminus of said main winding to a position on said bobbin for placement of said end bunch, means for rotating said bobbin to form said end bunch, a cam connected with said bobbin rotating means, a movable member engageable with said cam, a latch normally holding said movable member disengaged from said cam, a control member for supporting said latch, means acting on said control member in response to completion of the formation of said main winding to release said latch from said movable member, said movable member upon release being operably driven by said cam as said bunch is formed whereby to arrest rotation of said bobbin after a predetermined number of loops of yarn have been wound into said end bunch, and means for securing the end bunch in place on said bobbin.

6. Apparatus as set forth in claim 5 including means for severing said supply yarn from said end bunch.

7. Apparatus as set forth in claim 5 including an adjustable element operably associated with said movable member for controlling the number of loops of yarn to be wound into said end bunch.

8. Apparatus as set forth in claim 5 including adjustable means for guiding said supply yarn to said bobbin for formation of said end bunch.

9. Apparatus for forming a separate end bunch of a plurality of coils of yarn on a bobbin from a supply yarn as a continuation of a main winding of yarn on said bobbin comprising, means for disposing said bobbin in a winding position, a member for shifting said supply yarn from the outer terminus of said main winding to a position on said bobbin for placement of said end bunch, means for rotating said bobbin to form said end bunch, means for arresting rotation of said bobbin at the completion of the formation of said end bunch, means for displacing a portion of an inner coil of yarn of said end bunch over at least a portion of the final coil of yarn wound in the end bunch, a pair of yarn clamping members, means for locating said clamping members in an inoperative position during formation of said end bunch, drive means for moving said clamping members to engage the supply yarn extending from said end bunch at the completion of the formation of said end bunch, and guide means for controlling the movement of said clamping members whereby said clamping members seize the supply yarn within the axial confines of said end bunch to draw said final coil and said inner coil against said end bunch to yieldably fix said end bunch in position on said bobbin.

10. Apparatus as set forth in claim 9 including a pair of cutting members operative to sever said supply yarn from said end bunch.

11. Apparatus as set forth in claim 10 wherein said means for displacing said inner coil portion is carried by a first one of said cutting members.

12. Apparatus for forming a separate end bunch of a plurality of yarn coils on a bobbin from a supply yarn as a continuation of a main winding of yarn on said bobbin comprising, means for disposing said bobbin in a winding position, a member for shifting said supply yarn from the outer terminus of said main winding to a position on said bobbin for placement of said end bunch, means for winding an end bunch at said position, a loopmaker for engaging said supply yarn at its point of attachment with the final yarn coil wound into said end bunch, means for revolving said loopmaker to move a portion of said inward coil upwardly of the periphery of said end bunch, a member for displacing said inner coil portion across said end bunch to overlay at least a portion of the final yarn coil, a pair of yarn clamping members, means for positioning said clamping members in an inoperative position during formation of said end bunch, drive means for moving said clamping members to engage the supply yarn extending from said end bunch at the completion of the formation of said end bunch, and guide means for controlling the movement of said clamping members whereby said clamping members seize the supply yarn within the axial confines of said end bunch to draw said final coil against said end bunch to yieldably fix said end bunch in position on said bobbin.

13. Apparatus as set forth in claim 12 including means for rotating said bobbin to form said end bunch.

14. Apparatus as set forth in claim 12 wherein said loopmaker is engageable with said supply yarn as said supply yarn extends from a supply source to said end bunch.

15. Apparatus as set forth in claim 12 including means for controlling the size of said end bunch.

16. Apparatus as set forth in claim 12 including stop means for controlling rotation of said loopmaker.

17. Apparatus as set forth in claim 12 wherein said loopmaker includes a fixed bill for engaging said yarn in said end bunch to move said coil portion upward, and cam means for moving said upward coil portion from said bill across the periphery of said end bunch.

18. Apparatus as set forth in claim 12 including means for severing said supply yarn from said end bunch.

19. Apparatus as set forth in claim 12 wherein said member for shifting said supply yarn from the outer terminus of said main winding includes yarn guiding means.

20. Apparatus as set forth in claim 12 including adjustable means for guiding said supply yarn to said bobbin for winding said end bunch at a selected position thereon.

21. In a bobbin winding machine, a rotary winding spindle adapted to support a bobbin for rotation, means for rotating said spindle,
a reciprocable traverse rod,
means to reciprocate said rod,
a yarn guide connected on said traverse rod for reciprocation thereby,
means for feeding the yarn guide along the traverse rod during reciprocation of said guide to advance the guide longitudinally of said bobbin,
said yarn guide being adapted to distribute supply yarn on said bobbin to form a main winding of yarn,
a movable finger,
a latch normally operable to hold said finger in an inoperative position,
a rockable member for mounting said latch,
said rockable member being actuated in response to repeated strokes by the yarn guide as said guide reaches the end of its advance along the bobbin to thereby release said finger from control of said latch,
means for swinging said finger upon release in a path to shift said supply yarn from the outer terminus of said main winding to a position on said bobbin for placement of an end bunch of yarn,
slidable means for arresting rotation of said bobbin after said end bunch has been wound,
means for actuating said slidable means,
a loopmaker for engaging said supply yarn at its point of attachment with the final coil of yarn wound in said end bunch,
detent means normally holding said loopmaker in an inactive position,
said loopmaker being releasable from said detent means in response to actuation of said slidable means to arrest rotation of said bobbin,
drive means for revolving said loopmaker to move a portion of an inner yarn coil of said end bunch upwardly of the periphery of said end bunch,
a finger for guiding said inner coil portion across said end bunch to overlay at least a portion of the final yarn coil to yieldably fix said end bunch in position on said bobbin,
and a cam member for positively moving said inner coil across said finger.

22. Apparatus as set forth in claim 21 including a pair of yarn clamping-severing units,
means for positioning said unit in an inoperative position during winding of said end bunch,
drive means for moving said unit to engage the supply yarn at the completion of winding of said end bunch,
and guide means for controlling the movement of said unit whereby said unit seizes said supply yarn within the axial confines of said end bunch to sever said supply yarn and draw said final coil and said inner coil against said end bunch to yieldably fix said end bunch in position on said bobbin.

23. Apparatus as set forth in claim 21 including a resilient element for rotating said loopmaker,
and an abutment for controlling the rotation of said loopmaker.

24. Apparatus as set forth in claim 23 including a clutch,
and means for actuating said clutch to reset said loopmaker after operation of said loopmaker.

25. Apparatus as set forth in claim 21 wherein said means for arresting rotation of the bobbin includes a spiral cam connected to and operable with said spindle rotating means,
and control means advanced by said spiral cam for rendering said bobbin rotating means inoperative when the end bunch has been wound.

26. Apparatus as set forth in claim 25 including a trip element yieldably restraining said slidable means in a first position for driving said bobbin,
said slidable means when unrestrained being movable to a second position for arresting rotation of said bobbin,
said control means including a lever engageable with said spiral cam in response to movement of said rockable member,
said spiral cam being operable to advance the lever to displace said trip-element and thereby release said slidable means for movement to its second position.

27. Apparatus as set forth in claim 26 including a sizing link disposed in the zone between said lever and said trip-element and operable to regulate the engagement of said lever with said trip-element,
and an adjusting screw for positioning said link at a predetermined location in said zone to thereby control the release of said slidable means.

28. Apparatus as set forth in claim 26 including a latching element supported on said rockable member,
said latching element acting normally to hold said lever disengaged from said spiral cam,
said latching element being movable to release said lever in response to actuation of said rockable element,
resilient means for biasing said lever into engagement with said spiral cam when released from said latching element,
and a push-bar operable in response to movement of said slidable means to said second position for disengaging said lever from said spiral cam.

29. In a bobbin winding machine,
a rotary winding spindle adapted to support a bobbin for rotation,
means for rotating said spindle,
a reciprocable traverse rod,
means to reciprocate said rod,
a yarn guide connected on said traverse rod for reciprocation thereby,
means for feeding the yarn guide along the traverse rod during reciprocating of said guide to advance the guide longitudinally of said bobbin,
said yarn guide being adapted to distribute supply yarn on said bobbin to form a main winding of yarn,
a movable finger,
a latch normally operable to hold said finger in an inoperable position,
said latch being operable by said yarn guide as the guide reaches the end of its advance along the bobbin to release the finger from control of said latch,
means for swinging said finger when released in a path to shift said supply yarn from the outer terminus of said main winding to a position on said bobbin for placement of an end bunch of yarn,
means for arresting rotation of said bobbin after said end bunch has been wound,
a loopmaker for engaging said supply yarn at its point of attachment with said final coil of yarn wound in said bunch,
detent means normally holding said loopmaker in an inactive position,
said detent means being releasable from said loopmaker concurrently with arresting of the rotation of said bobbin,
drive means for revolving said loopmaker to move a portion of an inner coil of yarn of said end bunch upwardly of the periphery of said end bunch,
a rockable bill for receiving said inner coil as said loopmaker is rotated,
and a cam member for rocking said bill to deposit said inner coil portion across said end bunch to overlay at least a portion of the final yarn coil to yieldably fix said end bunch in position on said bobbin.

30. Apparatus as set forth in claim 29 including a pair of yarn clamping-severing units,
means for positioning said unit in an inoperative position during winding of said end bunch,
drive means for moving said unit to engage the supply yarn at the completion of winding of said end bunch, and guide means for controlling the movement of said unit whereby said unit seizes said supply yarn within the axial confines of said end bunch to sever said supply yarn and draw said final coil and said inner coil against said end bunch to yieldably fix said end bunch in position on said bobbin.

31. Apparatus as set forth in claim 30 wherein said cam member is carried on said clamping-severing unit.

References Cited by the Examiner

UNITED STATES PATENTS

| | | | |
|---|---|---|---|
| 2,657,867 | 11/53 | Furst | 242—32 X |
| 2,695,138 | 11/54 | Perry et al. | 242—27 X |
| 3,037,715 | 6/62 | Higgins et al. | 242—18 |
| 3,037,716 | 6/62 | Dietiker | 242—18 |
| 3,110,450 | 11/63 | Raasch | 242—18 |
| 3,117,738 | 1/64 | Raasch et al. | 242—18 |

FOREIGN PATENTS 296,203  1/17  Germany.

MERVIN STEIN, *Primary Examiner.*